J. S. WERTIN.
TRANSMISSION APPARATUS.
APPLICATION FILED JUNE 17, 1916.

1,217,674.

Patented Feb. 27, 1917.
5 SHEETS—SHEET 1.

Witness
P. M. Hunt
N. G. Minnett

Inventor
John S. Wertin

By John Louis Waters & Co.
Attorney

J. S. WERTIN.
TRANSMISSION APPARATUS.
APPLICATION FILED JUNE 17, 1916.

1,217,674.

Patented Feb. 27, 1917.
5 SHEETS—SHEET 5.

Inventor
John S. Wertin.

Witness
By John Louis Waters & Co.
Attorney

UNITED STATES PATENT OFFICE.

JOHN S. WERTIN, OF COKEDALE, COLORADO.

TRANSMISSION APPARATUS.

1,217,674.          Specification of Letters Patent.      Patented Feb. 27, 1917.

Application filed June 17, 1916. Serial No. 104,291.

*To all whom it may concern:*

Be it known that I, JOHN S. WERTIN, a citizen of the United States, residing at Cokedale, in the county of Las Animas and State of Colorado, have invented certain useful Improvements in Transmission Apparatus, of which the following is a specification, reference being had therein to the accompanying drawing.

This invention relates to improvements in transmission apparatus, one object of the invention being the provision of an apparatus of this character which is adapted to receive power from an explosion engine or an electric motor, the rotative speed of which cannot be altered without impeding the output of power thereof, and transmit power at varying speeds to the driven element, such transmission apparatus being composed of friction elements which permit of the change of speed without undue jar upon any of the parts.

A further object of this invention is the provision of an apparatus of this character which employs a plurality of cables that are operably connected at all times to the prime mover, while the driven element is operably connected to said cables through a selective mechanism carrying a plurality of cable engaging elements, whereby one of said elements at a time may be thrown into operation to vary the speed ratio, and at the same time transmit power from the prime mover to the driven element.

A further object of this invention is the provision of a device of this character which will have a wide range of speed changes and which will permit of the alteration of the speed transmitted without shock, stoppage, or interference with the prime mover or driven element.

With the foregoing and other objects in view and which will appear as the description proceeds, this invention resides in the novel arrangement and combination of parts hereinafter set forth, the invention being limited only by what is claimed.

Figure 1:
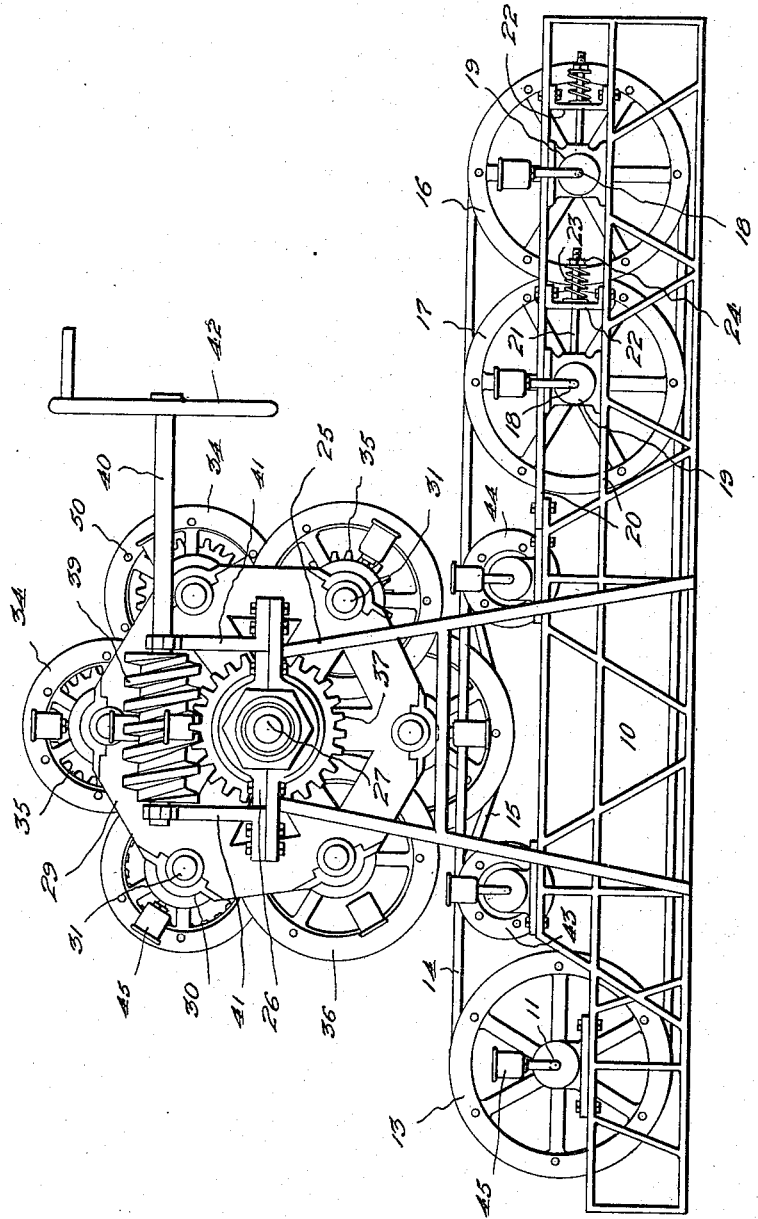
Figure 1 is a side elevation of the complete transmission mechanism, the prime mover and the driven element not being shown.
Figure 2:
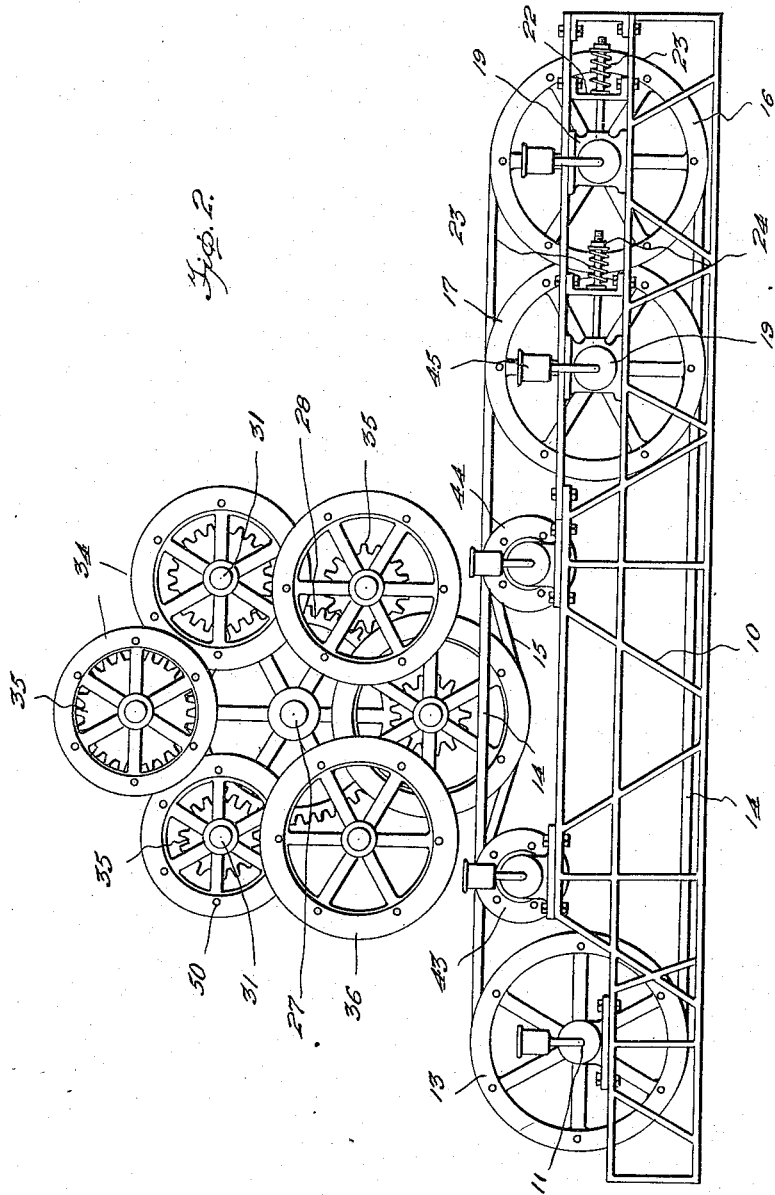
Fig. 2 is a sectional view through the driven element attaching device, the cable supporting means being shown in side elevation.
Figure 3:
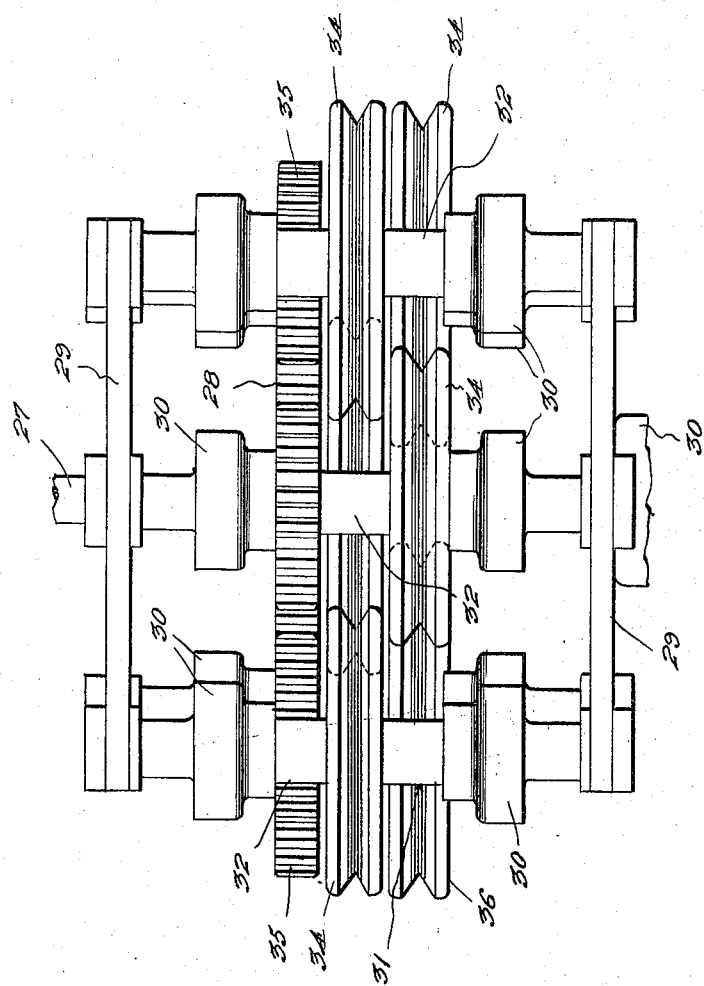
Fig. 3 is a top plan view of the driven element attaching device.
Figure 4:
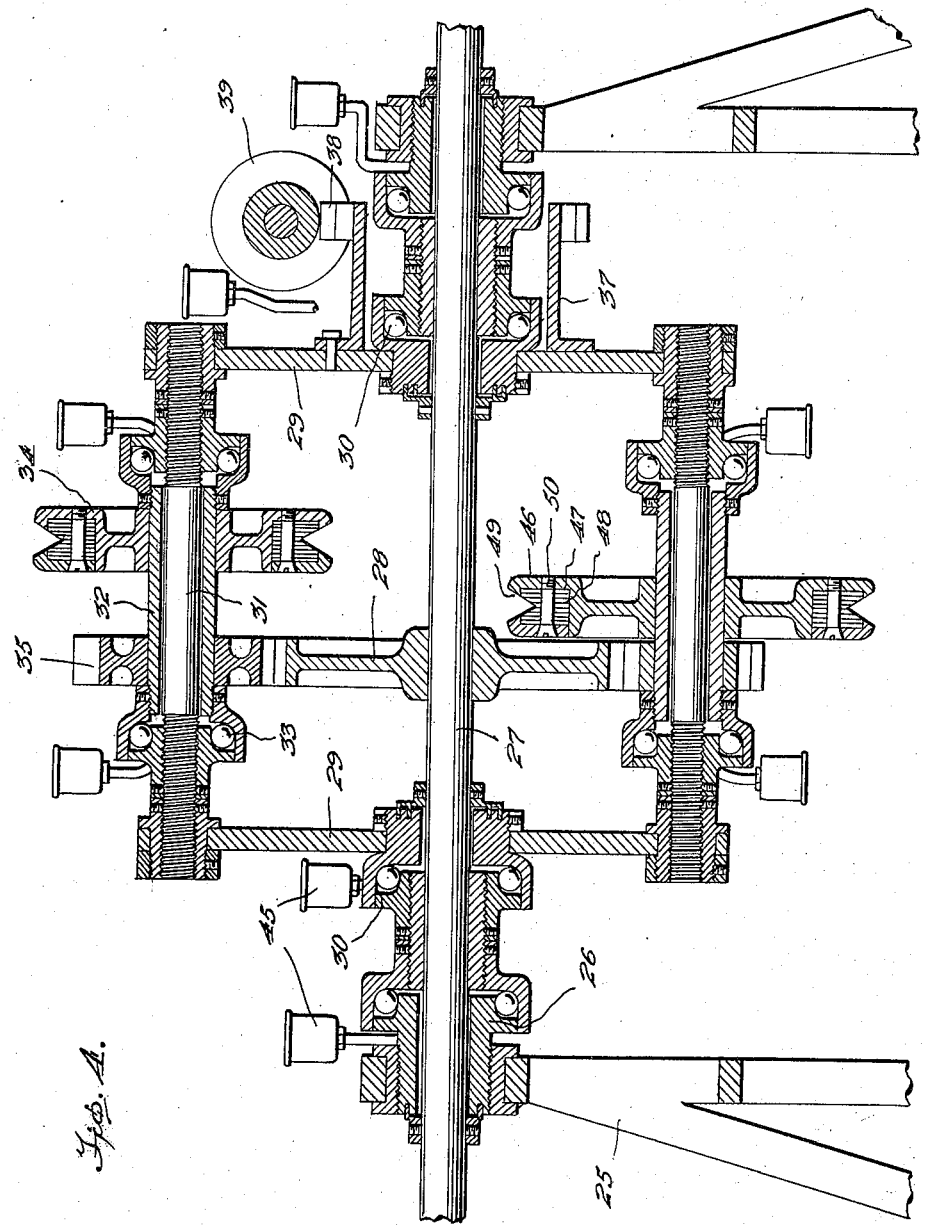
Fig. 4 is a fragmentary vertical transverse sectional view through the transmission mechanism.
Figure 5:
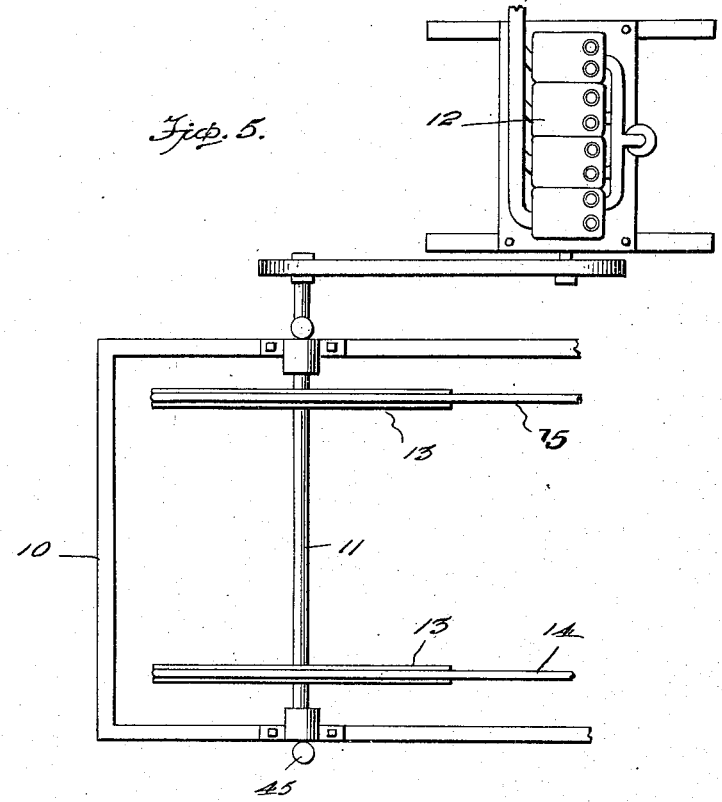
Fig. 5 is a top plan view on a reduced scale of the present mechanism showing the prime mover connected thereto.
Figure 6:
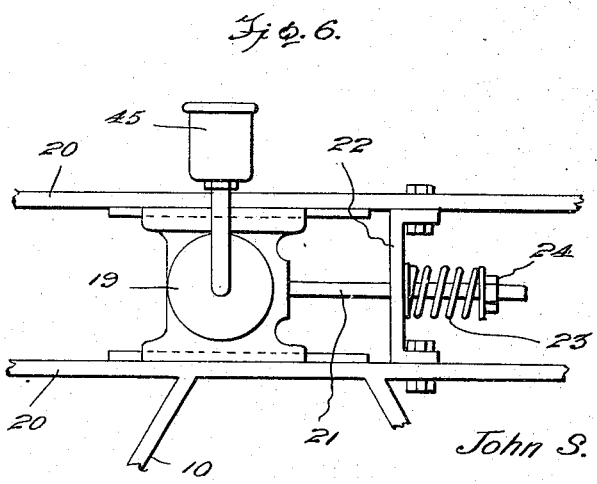
Fig. 6 is a detail view of one adjustable boxing.

Referring to the drawings, the numeral 10 designates the supporting framework for the prime mover and the operated shaft 11 which is operably connected to the prime mover 12, here shown as an explosion engine of a fixed rotative speed.

Fast upon the shaft 11 are two pulleys 13, around which are trained the respective cables 14 and 15, which in turn are trained around the respective pulleys 16 and 17. These pulleys 16 and 17 are mounted upon shafts 18 which in turn are journaled in boxings 19.

These boxings are mounted for sliding movement in the parallel members 20 of the frame 10 and have each attached thereto a stem 21 which is passed through the spanning plate 22 to carry a spring 23, the tension of which is adjusted by means of the nut 24. By this arrangement the cables 14 and 15 are held taut and both are rotated simultaneously in the same direction.

The super-structure 25, provided with the boxings 26, is so disposed as to support the driven shaft 27 above the frame 10, while fast to said shaft is a gear 28.

Mounted for selective rotation upon the shaft 27 are the end plates or spiders 29 carrying the antifrictional bearings 30.

Connected at equally distant points and forming a cage with the spiders 29 are the stationary tie rods or shafts 31, here shown six in number. Mounted upon each of these shafts is a sleeve 32 which rotates freely and is supported by the antifrictional bearings 33.

Mounted upon five of these sleeves 32 are pulleys 34, all of varying diameters, and being for engagement, as will presently appear, with the respective cables 14 and 15.

Fixed to each sleeve 32 that carries the pulley 34 is a pinion 35, each one of which is also of a different diameter, and meshes at all times with the driven gear 28.

A freely rotatable pulley 36 is mounted upon the remaining shaft or sleeve 32 and runs as an idler when it is desired that no motion shall be transmitted from the prime mover to the driven shaft 27.

In order that the respective pulleys 34 may selectively engage the respective cables 14 and 15, a sleeve 37 is attached to one of the spiders 29 and carries a gear 38 which is in mesh at all times with the worm 39 carried upon the shaft 40 which in turn is journaled in the brackets 41 and is operated through the crank wheel 42.

By this means either one of the respective pulleys 34 may be placed in engagement with its respective cable 14 or 15 between the guide pulleys 43 and 44 journaled in the framework 10 and in a position to oppose the action of the pulley 34 in engagement with the cable.

Any form of lubricating devices, as for instance, the grease cups 45, may be provided to furnish lubricants to the various parts of the present apparatus.

From the foregoing description, it is evident that a transmission device of this character is so arranged that with the prime mover running at a fixed speed, various speeds may be transmitted through the cables 14 and 15 and the respective pulleys 34 to the driven shaft 27, and from there conveyed to any desired mechanism, as for instance, the propeller of an aeroplane, or to shafting or other elements that it is desired to operate.

In the construction of pulley here shown it will be noted that the rim 46 thereof is provided with the receptacle 47 for the annular friction block 48, the metal rims with the inwardly projecting portion 49 thus overlapping the friction block in such a manner as to hold them securely in position, the countersunk screws 50 holding the rim sections relatively together to clamp the block 48 in place.

Should it be found that a range of five speeds, as here shown, is insufficient to meet the requirements, two of the present apparatus may be mounted in tandem, the main driving shaft of the first apparatus being operably connected to the second apparatus and thus giving a range of five times, as here shown, or approximately twenty-five speeds.

Thus, when operating under the lowest or first speed of the first apparatus, the five speeds, as here shown, would be transmitted to the second apparatus, each pulley 34 stepping this up or continuing so that the twenty-five speeds may be transmitted with two of the present apparatus arranged in tandem.

What I claim as new is:—

1. The combination with a prime mover, of a transmission apparatus, including a supporting structure, a shaft operably connected to the prime mover, a plurality of pulleys fixedly connected to said shaft, a plurality of spring controlled shafts mounted in the structure, a pulley carried by each, a plurality of cables connecting the pulleys of the first shaft and of the spring controlled shafts, a driven shaft, and a plurality of selective cable engaging members operably connected to the driven shaft for engagement one at a time with one of the cables.

2. The combination with a prime mover, of a transmission apparatus, including a supporting structure, a shaft operably connected to the prime mover, a plurality of pulleys fixedly connected to said shaft, a plurality of spring controlled shafts mounted in the structure, a pulley carried by each, a plurality of cables connecting the pulleys of the first shaft and of the spring controlled shafts, a driven shaft journaled in the upper portion of the supporting structure and above the cables, a cage freely rotatable upon the driven shaft, a plurality of shafts journaled in the cage, a pulley fast to each of said shafts for engagement one at a time with the cables, transmission mechanism between said pulley shafts and the driven shaft, and selective means for rotating the cage to connect one of the pulleys at a time with a cable.

3. The combination with a prime mover, of a transmission apparatus, including a supporting structure, a shaft operably connected to the prime mover, a plurality of pulleys fixedly connected to said shaft, a plurality of spring controlled shafts mounted in the structure, a pulley carried by each, a plurality of cables connecting the pulleys of the first shaft and of the spring controlled shafts, a driven shaft journaled in the upper portion of the supporting structure and above the cables, a cage freely rotatable upon the driven shaft, a plurality of shafts journaled in the cage, a pulley fast to each of said shafts for engagement one at a time with the cables, transmission mechanism between said pulley shafts and the driven shaft, a gear operably connected to the cage, and a manually operated worm gear mounted in the supporting structure and operably connected to the last gear, whereby the cage may be rotated to selectively engage a pulley with one of the cables.

4. The combination with a prime mover, of a transmission mechanism, including a supporting frame, a shaft journaled therein and operably connected to the prime mover, two pulleys fast to said shaft, two shafts journaled transversely of the frame, two pairs of spring controlled boxings mounted in the frame and operably connected to the latter shafts, a pulley fast to each of the last mentioned shafts, two cables connecting the two pulleys of the first shaft to the remaining pulleys, a driven shaft, and selective transmission means operably connected to the driven shaft and for connection with one of the cables at a time.

5. The combination with a prime mover, of a transmission mechanism, including a supporting frame, a shaft journaled therein and operably connected to the prime mover, two pulleys fast to said shaft, two shafts journaled transversely of the frame, two pairs of spring controlled boxings mounted in the frame and operably connected to the latter shafts, a pulley fast to each of the last mentioned shafts, two cables connecting the two pulleys of the first shaft to the remaining pulleys, a driven shaft journaled above the supporting frame and the cables, a cage rotatably mounted upon the driven shaft, a plurality of shafts journaled in the cage, a pulley fast to each of said shafts for engagement with the cables, coöperative means carried by each of said shafts and the driven shaft for transmitting power to the driven shaft, and selective means for rotating the cage to connect one of the pulleys at a time to a cable.

In testimony whereof I affix my signature.

JOHN S. WERTIN.

Copies of this patent may be obtained for five cents each, by addressing the "Commissioner of Patents, Washington, D. C."